US007485802B2

(12) United States Patent
Yoshida et al.

(10) Patent No.: US 7,485,802 B2
(45) Date of Patent: Feb. 3, 2009

(54) CIRCUITRY ASSEMBLY AND ELECTRICAL JUNCTION BOX INCORPORATING THE SAME

(75) Inventors: Masaoki Yoshida, Ogasa-gun (JP); Katsuhiro Kubota, Ogasa-gun (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/608,196

(22) Filed: Jun. 30, 2003

(65) Prior Publication Data

US 2004/0003938 A1 Jan. 8, 2004

(30) Foreign Application Priority Data

Jul. 3, 2002 (JP) .......................... P2002-194222

(51) Int. Cl.
*H02G 3/08* (2006.01)

(52) U.S. Cl. ........................ 174/50; 174/72; 174/88 R; 174/520; 439/76.2; 439/85; 361/719

(58) Field of Classification Search .................. 174/50, 174/72, 88 R, 520; 439/34, 115, 874, 76.2, 439/721, 43, 85, 714; 29/872; 361/719
See application file for complete search history.

(56) References Cited

U.S. PATENT DOCUMENTS 3,668,301 A * 6/1972 Faulconer ................ 174/88 R
3,903,574 A * 9/1975 Fraioli ........................ 403/398
4,201,436 A * 5/1980 Genovese et al. ............ 439/48
4,249,304 A * 2/1981 Weinmann et al. ............ 29/872
4,529,258 A 7/1985 Anthony
4,818,236 A * 4/1989 Nakayama et al. ............ 439/34
6,268,566 B1 * 7/2001 Takiguchi et al. ......... 174/72 A
6,290,509 B1 * 9/2001 Hattori et al. .............. 439/76.2
6,390,830 B1 * 5/2002 Onizuka .................... 439/76.2
6,406,323 B2 * 6/2002 Chung Long Shan ....... 439/395

FOREIGN PATENT DOCUMENTS

EP 0 571 156 A2 11/1993
EP 0 668 629 A2 8/1995
JP 7-9023 U 1/1995
JP 07-153513 A 6/1995
JP 08-017259 A 1/1996
JP 08-222290 A 8/1996
JP 2001-045633 A 2/2001

OTHER PUBLICATIONS

Japanese Office Action dated Aug. 31, 2006 issued in Japanese Patent Application 2002-194222.

* cited by examiner

*Primary Examiner*—Dhiru R Patel
(74) *Attorney, Agent, or Firm*—Sughrue Mion, PLLC

(57) ABSTRACT

In a circuitry assembly, a first insulative sheet is disposed between first electric wires and second electric wires intersecting each other. A wiring member holds the first electric wires and the second electric wires. The circuitry assembly is accommodated in a casing body of an electrical junction box. Each of the first electric wires held by the wiring member is press-fitted to a first terminal to be electrically connected therewith. Each of the second electric wires held by the wiring member is press-fitted to a second terminal to be electrically connected therewith.

19 Claims, 11 Drawing Sheets

CIRCUITRY ASSEMBLY AND ELECTRICAL JUNCTION BOX INCORPORATING THE SAME

BACKGROUND OF THE INVENTION

This invention relates to automotive elements for an air bag or the like, and more particularly to a circuitry assembly and an electrical junction box having connectors for such automotive elements.

FIGS. 10A and 10B show a branch structure of flat cables disclosed in Japanese Patent Publication No. 8-17259A.

Each of flat cables 61 and 62 comprises an insulative layer 63 made of synthetic resin, and a plurality of cable conductors 64 embedded in the insulative layer 63. Hole portions 65 are formed in one side (face) of the insulative layer 63 by partly removing the insulative layer 63, and are disposed in registry with the cable conductors 64, respectively. The hole portions 65 in the flat cable 61 are opposed respectively to the hole portions 65 in the flat cable 62, and the corresponding two cable conductors 64 of the two flat cables are connected together by a solder layer 66 disposed in the hole portions 65.

FIG. 11 shows an electrical junction box disclosed in Japanese Utility Model Publication No. 7-9023U.

This electrical junction box 71 comprises: an upper cover 72 and a lower cover 73 which are made of synthetic resin to jointly form a box body; a wiring board 74 and a bus bar wiring board 75 which are accommodated between the two covers 72 and 73 in a stacked manner.

The wire wiring board 74 comprises: an insulative board 76 made of synthetic resin; a plurality of sheathed wires 77 laid on a surface of the insulative board 76; and terminals 78 which extend through the insulative board 76 to which the wires 77 are press-fitted. A press-fitting portion 78*a* is formed at one end of the terminal 78 while a male tab-like electrical contact portion 78*b* is formed at the other end thereof.

The bus bar wiring board 75 comprises an insulative board 79 and a plurality of bus bars 80 installed on a surface of the insulative board 79. The bus bar 80 has an integral male tab-like terminal 81 extending upwardly or downwardly therefrom.

The terminals 78 and 81 project into associated housings 82 and 83 formed at the upper cover 72 and the lower cover 73, and the terminals 78 and 81 are combined with the housings 82 and 83 to form connectors. External connectors (not shown), connected to external wire harnesses, are connected to these connectors. Instead of such external connectors, fuses or relays can be connected to the terminals within the housings 82 and 83 through relay terminals.

In the above branch structure, however, since the hole portions 65 are formed only in one side of the insulative layer 63 as shown in FIG. 10A, and the corresponding two cable conductors 64 are connected together through the solder layer 66 as shown in FIG. 10B, much time and labor are required for this connecting operation. And besides, accuracy is required for the operation, and there has been an anxiety that the efficiency of the operation is low.

In the electrical junction box 71 shown in FIG. 11, the plurality of rigid insulative boards 76 and 79, many wires 77 and the relatively-heavy bus bars 80 are used, and therefore there have been encountered problems that the structure is bulky and heavy, that the number of connection circuits is limited and that much time and labor are required for the operation for installing the wires 77 and for the operation for installing the bus bars.

SUMMARY OF THE INVENTION

It is therefore an object of the invention to provide a circuitry assembly and an electrical junction box in which the efficiency of an assembling operation is improved, while the structure is simplified.

In order to achieve the above object, according to the invention, there is provided a circuitry assembly, comprising:

a plurality of first electric wires, forming a first wire group;

a plurality of second electric wires, intersecting the first electric wire, while forming a second wire group;

a first insulative sheet, disposed between the first wire group and the second wire group; and a wiring member, which holds the first electric wires and the second electric wires.

In such a configuration, there is provided the circuitry assembly in which the efficiency of an assembling operation is excellent, and the structure is simplified.

Preferably, the first insulative sheet is formed with at least one opening located corresponding to at least one intersecting point at which one of the first electric wires and one of the second electric wires are electrically connected.

In such a configuration, the first wire group is positively kept insulated from the second wire group by the first insulative sheet, while the first electric wire is positively kept electrically connected to the second electric wire at the intersection point.

Preferably, the circuitry assembly further comprises a second insulative sheet, disposed between the wiring member and the second wire group.

In such a configuration, when other electrical parts are provided on the wiring member, the second wire group is positively kept insulated from these other electrical parts by the second insulative sheet.

Here, it is preferable that the second insulative sheet is formed with a plurality of grooves which respectively receive the second electric wires.

In such a configuration, the second electric wires are guided and received by the grooves formed in the second insulative sheet. Therefore, the second electric wires are securely installed on the second insulative sheet.

Preferably, the first insulative sheet is provided as a flexible film.

In such a configuration, since the first wire group need only to be spaced from the second wire group by a small distance generally equal to the thickness of the flexible film, the downsizing of the circuitry assembly can be achieved. In other words, since the distance between the first wire group and the second wire group is reduced, it is not necessary to carry out a process in which a forming operation is beforehand applied to the first wire group and/or the second wire group. Therefore, the assembling process for the circuitry assembly is simplified.

Preferably, the first insulative sheet is comprised of either polyethylene terephthalate or polyethylene naphthalate.

In such a configuration, there can be formed the film-like or plate-like insulative sheet which is strong, and has excellent insulating properties.

Preferably, at least one of the first electric wires and the second electric wires is plated with tin.

In such a configuration, the stability of contact between the first electric wire and the second electric wire, as well as their contactability, is enhanced. And besides, those portions of the first and second electric wires which intersect each other are prevented from oxidation.

Preferably, the wiring member is formed with a plurality of grooves each partly holding one of the first electric wires or one of the second electric wires.

In such a configuration, the first electric wires and the second electric wires are positively held respectively in the wiring member.

According to the invention, there is also provided an electric junction box, comprising:

a casing body, in which the above circuitry assembly is accommodated;

a first terminal, to which each one of the first electric wires held by the wiring member is press-fitted to be electrically connected therewith; and a second terminal, to which each one of the second electric wires held by the wiring member is press-fitted to be electrically connected therewith.

In such a configuration, the first electric wires or the second electric wires provided at the circuitry assembly are electrically connected respectively to the press-fitting terminals provided at the electrical junction box, simultaneously when the circuitry assembly is mounted in the casing body. Therefore, there is provided the electrical junction box which is excellent in assembling efficiency.

Preferably, the electrical junction box further comprises a cover, formed with a plurality of grooves which respectively receive the first electric wires.

In such a configuration, when the cover is attached to the casing body, the first electric wires are received respectively in the grooves formed in the cover, so that the cover will not apply an undue force to the first electric wires, and the reliability of the wires is enhanced. Accordingly, the downsizing of the electrical junction box is further enhanced.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Preferred embodiments of circuitry assemblies of the invention and preferred embodiments of electrical junction boxes of the invention will not be described in detail with reference to the drawings.

Figure 1:
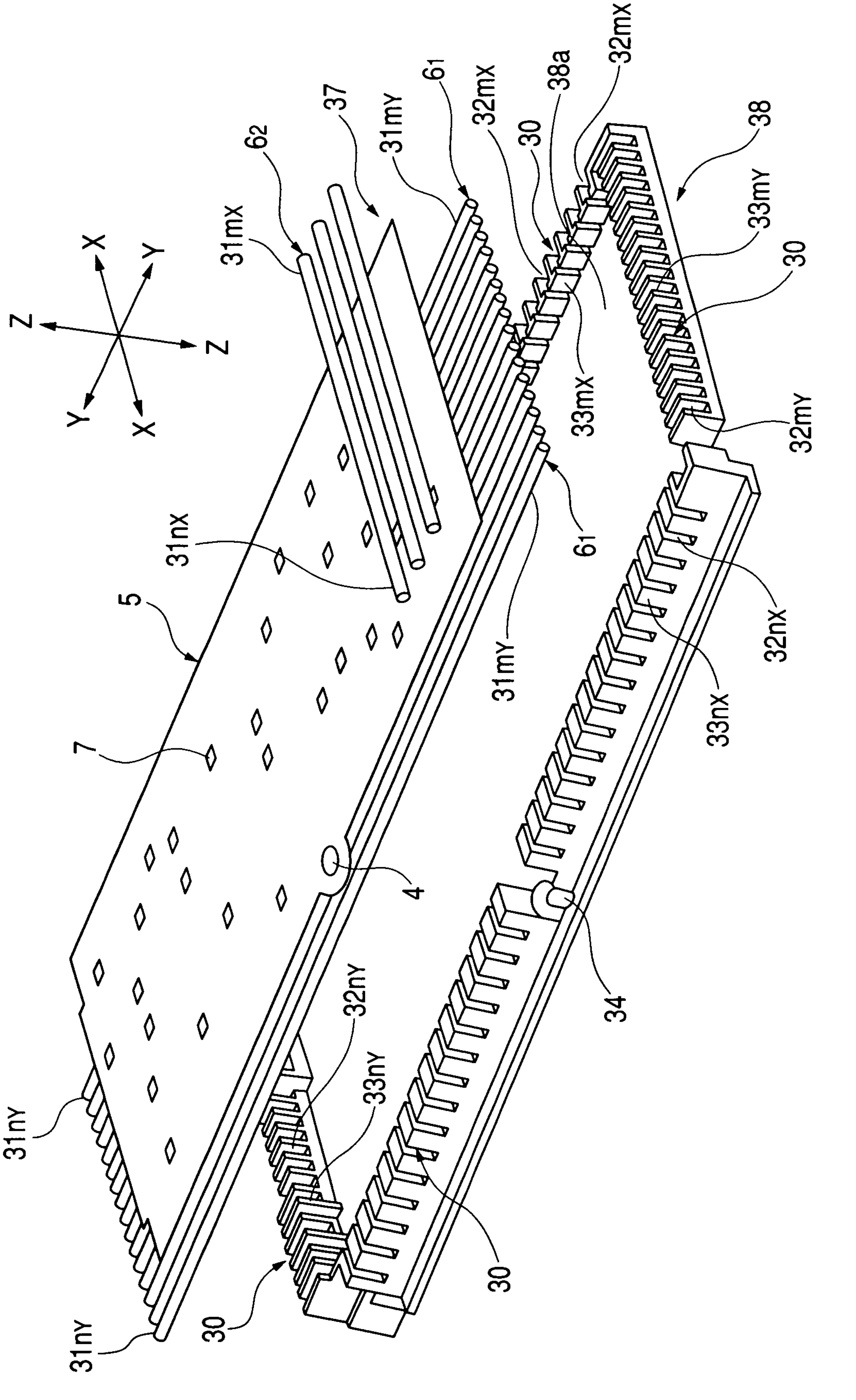
FIG. 1 is an exploded, perspective view of a circuitry assembly according to one embodiment of the invention.

As shown in FIG. 1, a circuitry assembly 37 comprises: generally-straight, elongated first wires $\mathbf{6}_1$ disposed at the lower side; generally-straight, elongated second wires $\mathbf{6}_2$ disposed above the first wires $\mathbf{6}_1$ in intersecting relation thereto; a generally-rectangular insulative sheet 5 made of synthetic resin and interposed between the first wires $\mathbf{6}_1$ and the second wires $\mathbf{6}_2$ to positively keep them insulated from each other; and a generally-rectangular wiring member 38 having wire fixing portions 30 for holding the first wires $\mathbf{6}_1$ and the second wires $\mathbf{6}_2$.

Figure 2:
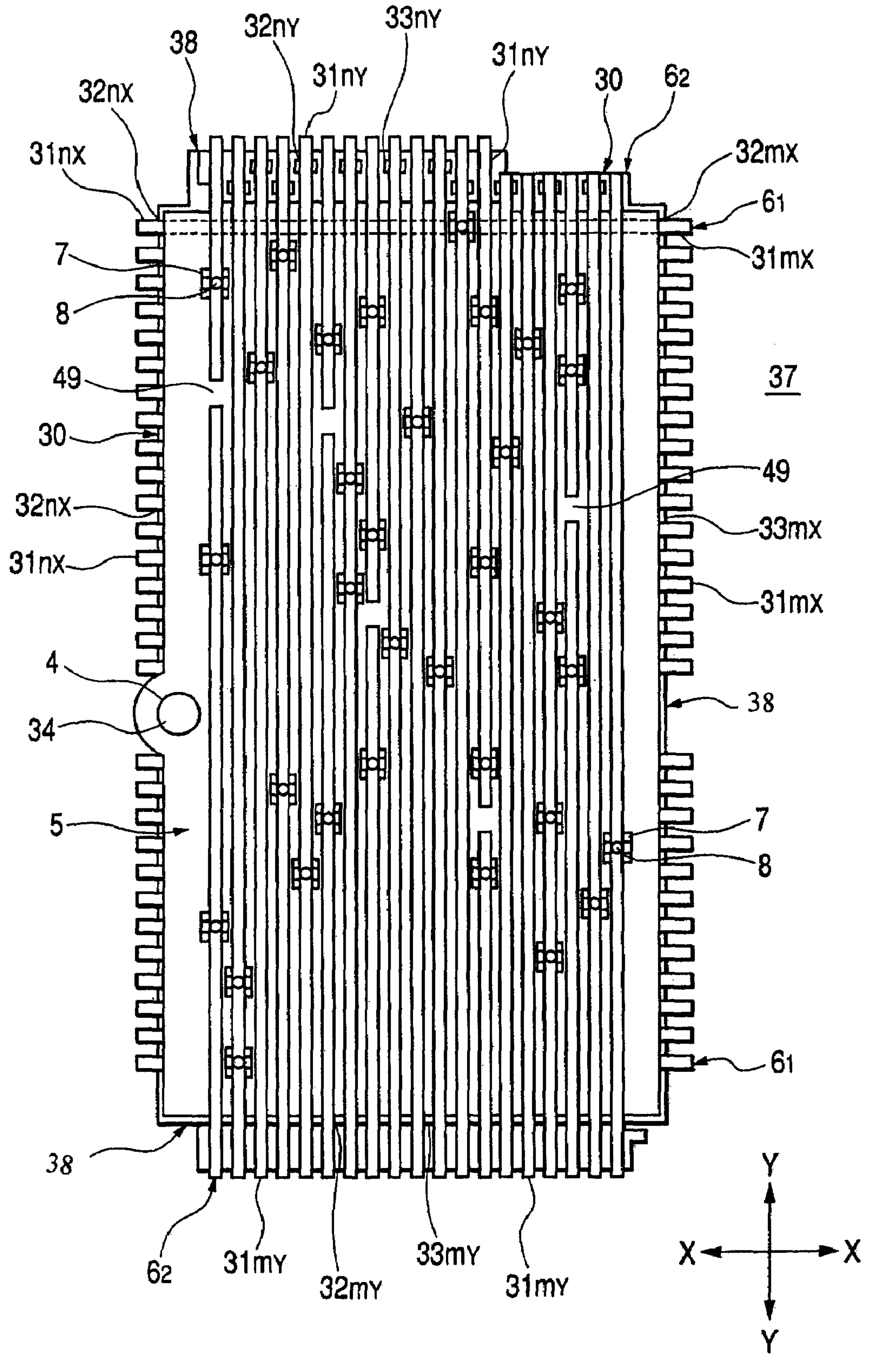
FIG. 2 is a plan view showing the circuitry assembly.
Figure 3:
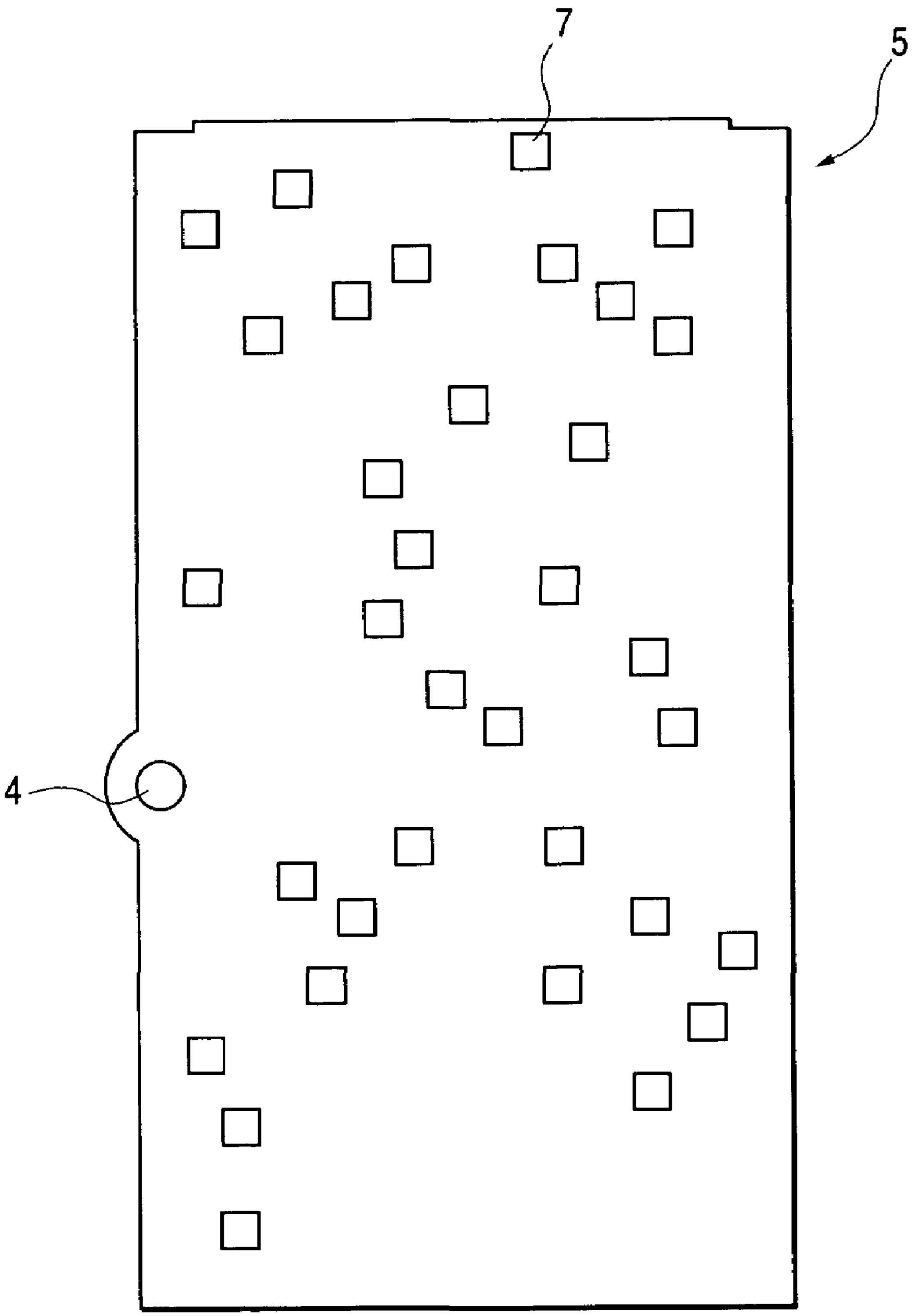
FIG. 3 is a plan view showing an insulative sheet.
Figure 5:
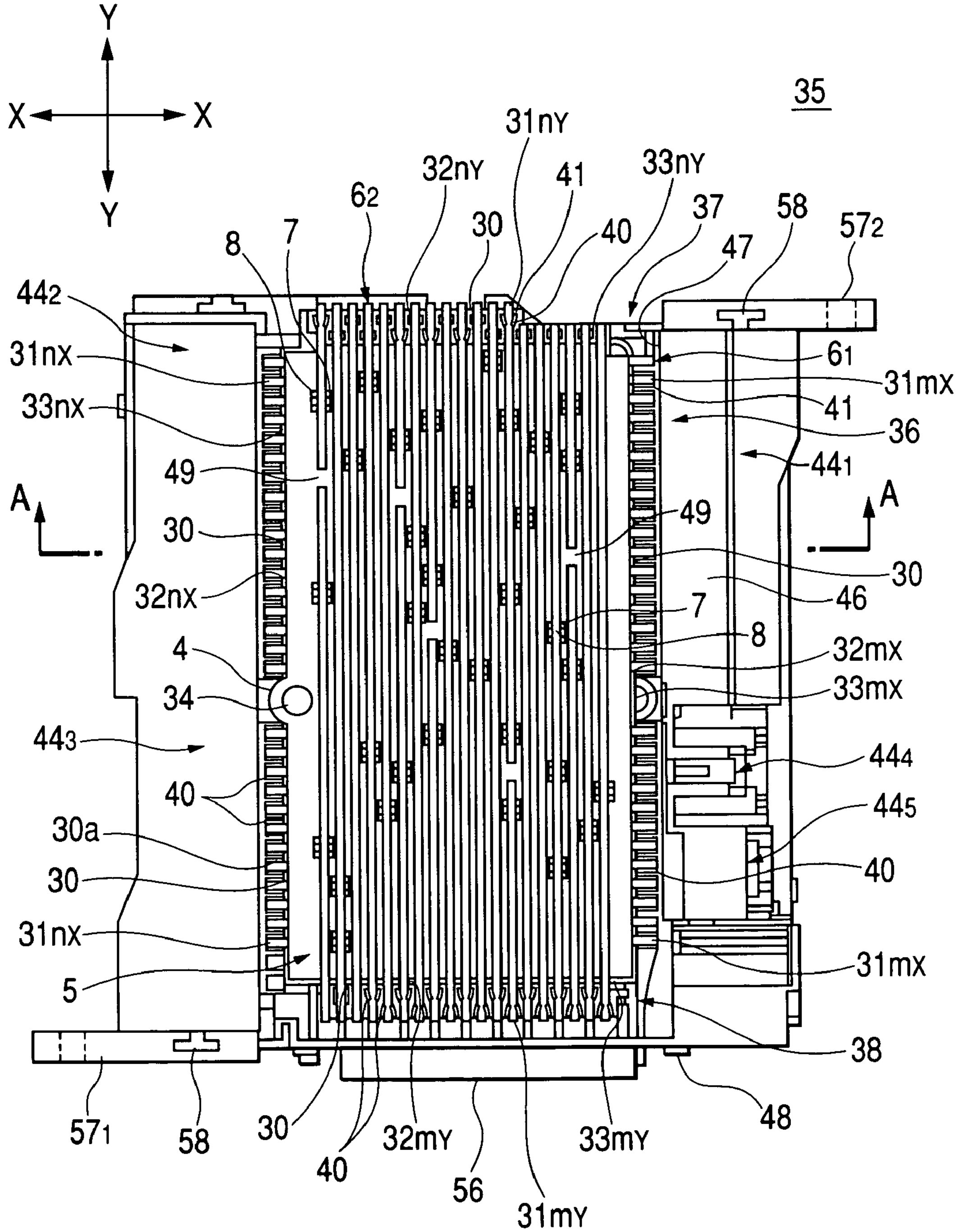
FIG. 5 is a plan view showing an electrical junction box incorporating the circuitry assembly.

In FIGS. 1, 2 and 5, the direction of a width (or the direction of short sides) of the circuitry assembly 22, 37 is defined as a direction X (transverse direction), and the direction of a length (or the direction of longer sides) of the circuitry assembly 22, 37 is defined as a direction Y (longitudinal direction).

In FIG. 1, that side of an insulative sheet 5 on which wires $\mathbf{6}_1$ are disposed is a lower layer side, and that side of the insulative sheet on which wires $\mathbf{6}_2$ are disposed is an upper layer side, and an upward-downward direction is a direction Z. The wires $\mathbf{6}_1$, disposed below the insulative sheet 5, are defined as first wires $\mathbf{6}_1$, and the wires $\mathbf{6}_2$, disposed above the insulative sheet 5, are defined as second wires $\mathbf{6}_2$.

Figure 8:
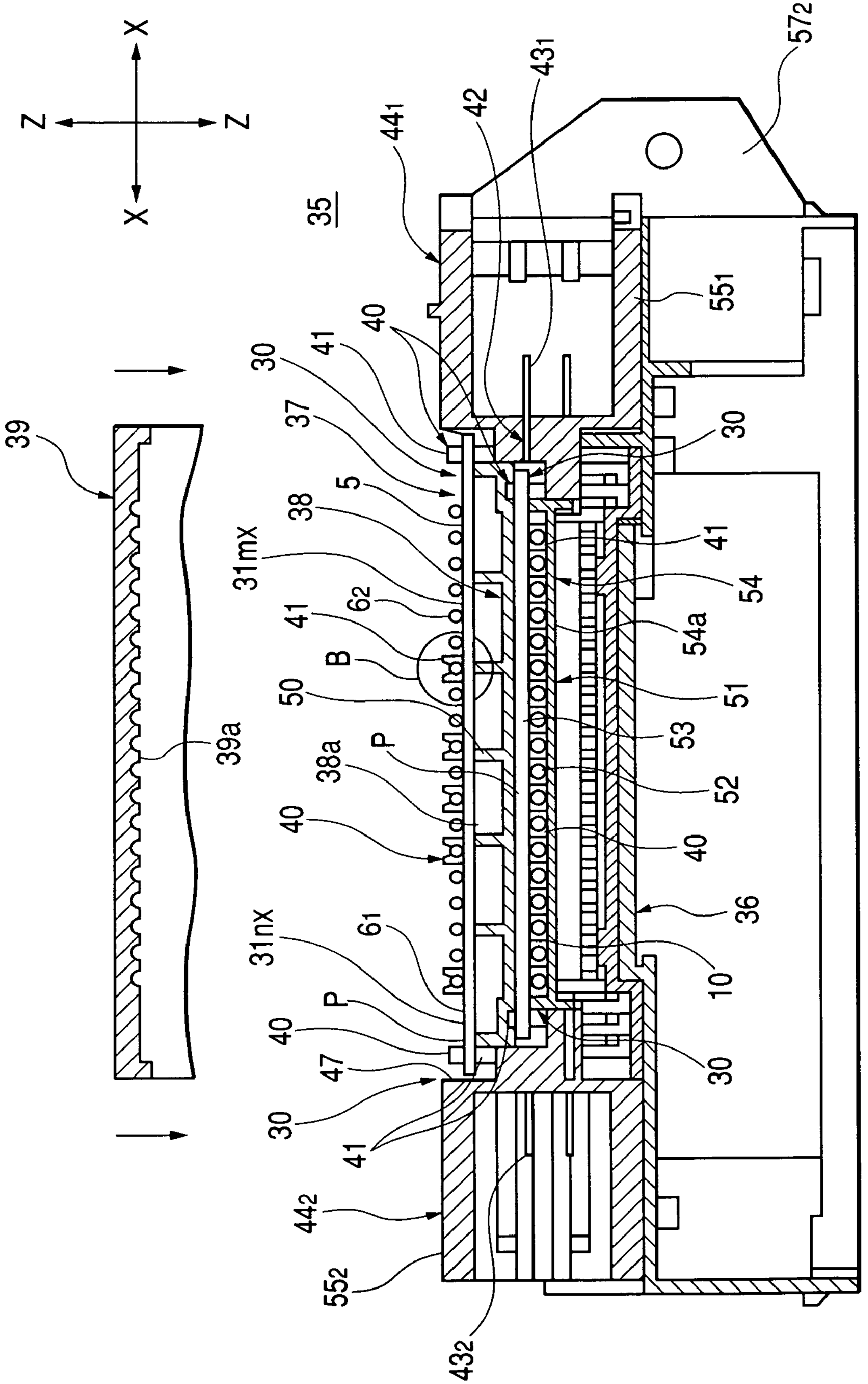
FIG. 8 is a cross-sectional view taken along the line A-A of FIG. 5.

In FIG. 8, that portion where the circuitry assembly 37 is disposed within a casing body 36 is defined as an upper layer side of an electrical junction box 35, and that portion where a circuitry assembly 51 is disposed within the casing 36 is defined a lower layer side of the electrical junction box 35. An upward-downward direction is defined as a direction Z.

The circuitry assembly 51 is analogous to the circuitry assembly 37. As will be appreciated from FIG. 8, the circuitry assembly 51 has a size smaller than the circuitry assembly 37 disposed above this circuitry assembly 51.

The circuitry assembly 51 comprises: generally-straight, elongated first wires 52 disposed at the lower side; generally-straight, elongated second wires 53 disposed above the first wires 52 in intersecting relation thereto; a generally-rectangular insulative sheet 10 made of synthetic resin and interposed between the first wires 52 and the second wires 53 to positively keep them insulated from each other; and a generally-rectangular wiring member 54 having the fixing portions 30 for holding the first wires 52 and the second wires 53.

These circuitry assemblies 37 and 51 are more excellent in assembling efficiency, and are more simple in structure than the related-art circuitry assembly. These circuitry assemblies may be called, for example, mutually-connecting members.

In this specification, the definitions “right and left”, “front and rear” and “upper and lower” are provided for convenience sake, that is, for the purpose of describing the various portions, and these do not always coincide with their corresponding directions when the circuitry assemblies and electrical junction box are actually used.

The number of the wires $\mathbf{6}_1$, $\mathbf{6}_2$, 52 and 53, provided in the electrical junction box 35, is suitably determined in accordance with a circuit configuration. The wires $\mathbf{6}_1$, $\mathbf{6}_2$, 52, 53 in each layer are arranged at a generally equal pitch. The pitch of the wires $\mathbf{6}_1$, 52 in the lower layer may be different from the pitch of the wires $\mathbf{6}_2$, 53 in the upper layer.

The wiring members 38, 54 are insulative members formed by an injection molding which is excellent in mass-productivity. In the wiring member 38, wire fixing portions 30 are integrally formed in four side edge portions of a rectangular plate body 38*a*. In the wiring member 54, wire fixing portions 30 are integrally formed in four side edge portions of a rectangular plate body 54*a*.

A fixing hole 34 for the passage of a screw, a bolt or the like therethrough is formed in one of the side edge portions of the wiring member 38 in order to securely fix the wiring member 38 to the casing body 36 of the electrical junction box 35.

As shown in FIGS. 1 and 8, the lower wires $\mathbf{6}_1$ and the upper wires $\mathbf{6}_2$ are superposed in the Z direction, and are electrically connected to each other only at necessary portions thereof. As shown in FIGS. 2 and 5, the lower wires $\mathbf{6}_1$ and the upper wires $\mathbf{6}_2$ perpendicularly intersect each other at intersection portions 8 corresponding respectively to openings 7 formed through the insulative sheet 5. The first wires $\mathbf{6}_1$ and the second wires $\mathbf{6}_2$ are exposed and electrically connected to each other at these openings 7.

With this wire connecting operation, the first wires $\mathbf{6}_1$ are positively kept insulated from the second wires $\mathbf{6}_2$ by the insulative sheet 5 interposed between the first wires 6, and the second wires $\mathbf{6}_2$, and also the first wires $\mathbf{6}_1$ and the second wires $\mathbf{6}_2$ are positively kept electrically connected to each other at the intersection portions 8.

In the circuitry assembly 51 disposed below the upper circuitry assembly 37 mounted in the electrical junction box 35 as shown in FIG. 8, the lower wires 52 and the upper wires 53 are superposed in the Z direction, and are electrically connected to each other only at necessary portions thereof. The lower wires 52 and the upper wires 53 perpendicularly intersect each other.

Figure 4:
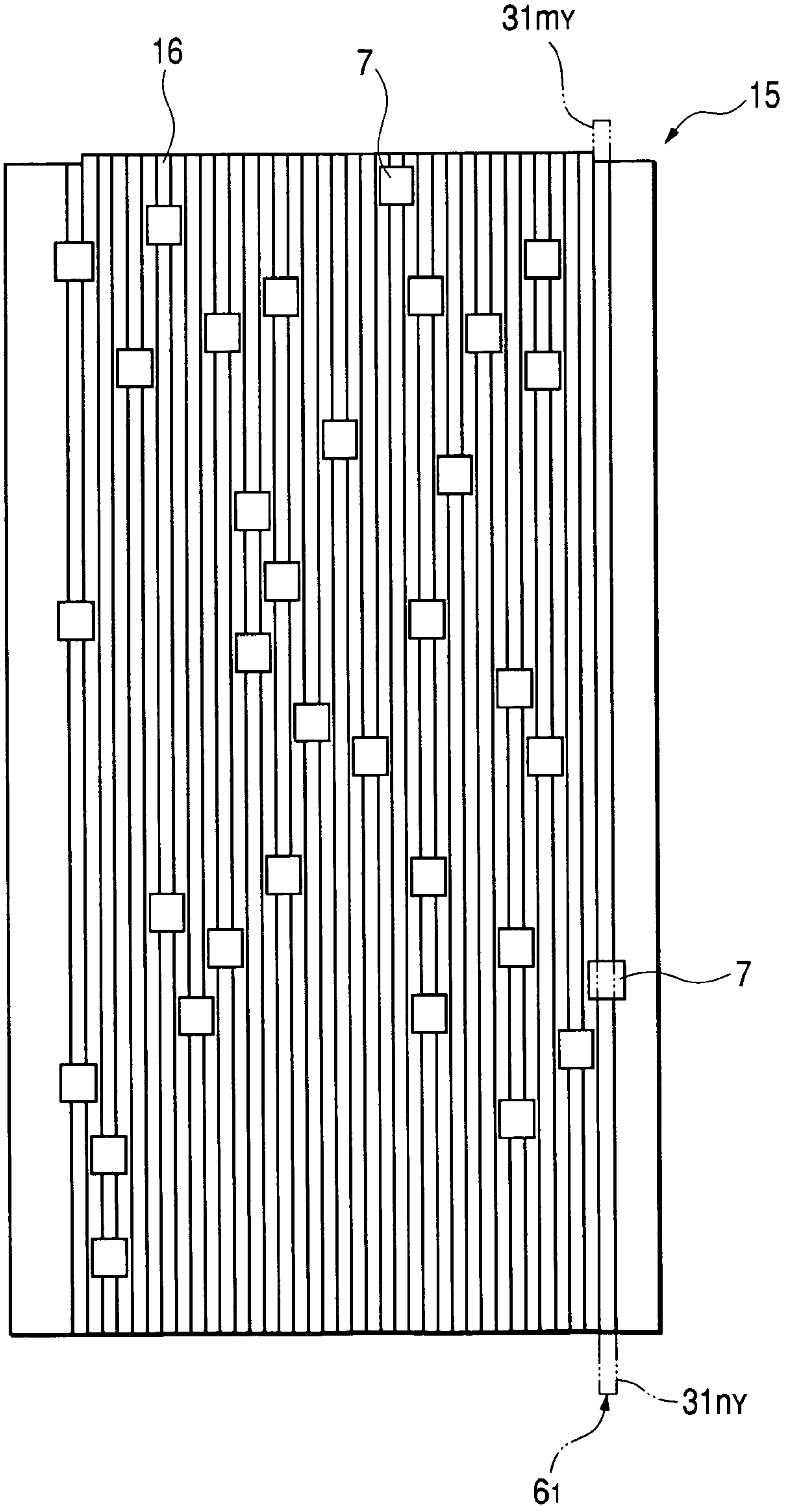
FIG. 4 is a plan view showing a modified example of the insulative sheet.

FIG. 4 shows a modified example of the insulative sheet 5. Such an insulative sheet 15 is slight thicker than the insulative sheet 5. In the insulative sheet 15, a plurality of openings 7 and generally-straight, narrow grooves 16 for respectively receiving the first wires $\mathbf{6}_1$ are formed. Each of the narrow elongate grooves 16 has a semi-circular cross-section whose width is generally equal to the outer diameter of the wire $\mathbf{6}_1$.

With this construction, the first wires $\mathbf{6}_1$ are received respectively in the grooves 16 in a guided manner, and are neatly arranged on the insulative sheet 15 accurately.

A plurality of wires do not always need to intersect each other perpendicularly, and for example, a plurality of wires can be directly connected to each other in such a manner that the wires obliquely intersect each other.

Although the first wires $\mathbf{6}_1$ are disposed below the second wires $\mathbf{6}_2$, that is, disposed on the lower side of the insulative sheet 5, and the first wires $\mathbf{6}_1$ are disposed close to the wiring member 38 as shown in FIG. 1, the insulative member 15 shown in FIG. 4 may be provided between the plurality of first wires $\mathbf{6}_1$ and the plate body 38*a* of the wiring member 38.

In the case where other electrical parts (not shown), such as bus bars, are provided on the wiring member 38, these electrical parts (not shown) are positively kept insulated from the first wires $\mathbf{6}_1$ by the insulative sheet 15.

Since a thin flexible film is used as the insulative sheet 5, the first wires $\mathbf{6}_1$, 52 need only to be spaced from the second wires $\mathbf{6}_2$, 53 by a small distance generally equal to the thickness of the flexible film. Therefore, the small-sized and compact design of the circuitry assembly 37, 51 can be achieved.

In other words, the distance between the first wires $\mathbf{6}_1$, 52 and the second wires $\mathbf{6}_2$, 53 is reduced.

Therefore, it is not necessary to carry out a process in which a forming operation is beforehand applied to the first wires $\mathbf{6}_1$, 52 and/or the second wires $\mathbf{6}_2$, 53. Accordingly, the assembling process for the circuitry assembly 37, 51 is simplified.

Each of the insulative sheets 5, 10 and 15 is formed by using a material containing at least one of polyethylene terephthalate (PET) or polyethylene naphthalate (PEN).

By using such a resin material as the material for molding each insulative sheet 5, 10, 15, there can be formed the film-like or plate-like insulative sheet 5, 10, 15 which is less liable to be torn, and is strong, and has excellent electrical insulating properties. The insulative sheet 5, 10, 15, containing PET or PEN, is molded, for example, as a biaxially oriented film.

A polyethylene terephthalate resin (PET) is produced by polycondensation of ethylene glycol and terephthalic acid, and is a polyester polymer. PET is excellent in electrical insulating properties and strength. When PET is used as a material for a film, a thin film, having a thickness, for example, of several μm to several hundreds of μm, can be formed. Examples of such PET films include ones produced by Toray Industries, Inc. and Teijin Limited.

Like the above PET, the PEN is excellent in electrical insulating properties and strength. A PEN-molded film is more excellent in various physical properties than the above PET-molded film, and can be formed into a smaller thickness than the PEN-molded film. When PEN is used as a material for a film, a thin film, having a thickness, for example, of several μm to several hundreds of μm, can be formed. Examples of such PEN films include a Q·film (product name) produced by Teijin Limited.

A fixing hole 4 is formed in the film-like insulative sheet 5 so as to correspond to the fixing hole 34 in the wiring member 38.

The rectangular openings 7 and the fixing hole 4, formed through each insulative sheet 5, 10, 15 are easily and accurately formed using, for example, a laser, punches, dies or others. In a hole-forming process for each insulative sheet 5, 10, 15, when the plurality of holes are simultaneously formed through the insulative sheet 5, 10, 15, using a plurality of punches (not shown), the holes 7 and the fixing hole 4 are rapidly formed through the insulative sheet 5, 10, 15.

Although the openings 7, formed through each insulative sheet 5, 10, 15, have a generally rectangular shape, these openings 7 are not limited to such a rectangular shape, but can have, for example, a circular shape as for the fixing hole 4. Such circular openings and the fixing hole 4 are formed, for example, by punching, that is, by the use of a cylindrical punch. As another alternative, the relevant portions of the insulative sheet, 5, 10, 15 are directly melt and removed, for example, by a laser of a high output power, and the insulative sheet 5, 10, 15, having the openings 7 and the fixation hole 4, can be used.

In the hole-forming process for the insulative sheet 5, 10, 15, preferably, for example, one punch (not shown) is used so that the hole-forming operation can be carried out accurately and positively, and in this case the holes are formed one by one while moving the insulative sheet 5, 10, 15 in a horizontal direction. Preferably, the insulative sheets 5, 10, 15 are subjected to the hole-forming operation independently of each other, so that the plurality of opening positions 7 and the fixing hole 4 can be accurately formed.

Each of the wires $\mathbf{6}_1$, $\mathbf{6}_2$, 52 and 53 is provided as a conductive metal (e.g., cupper) wire having a circular cross-section. Examples of such wires include a bare wire, such as the wire $\mathbf{6}_2$ having an exposed surface 6*a* shown in FIG. 9A, and a wire such as the wire 53 having its surface 6*a* coated with a plating material (e.g., tin P) as shown in FIG. 9B. Whether the bare wire or the plated wire is used is not limited to this example and may be determined for each of the wires $\mathbf{6}_1$, $\mathbf{6}_2$, 52 and 53 in accordance with the circuit configuration.

By thus applying the plating treatment to the wires, the stability of contact between the first wires $6_1$, 52 and the second wires $6_2$, 53, as well as their contactability, is enhanced. And besides, the first wires $6_1$, 52 intersect the second wires $6_2$, 53, so that the electrically-connected portions of these wires are prevented from oxidation.

When at least one or both of the first and second wires are subjected to the plating treatment, the corrosion resistance of the wires are enhanced. Preferably, the wires $6_1$, $6_2$, 52 and 53 are beforehand plated with tin P or the like over the entire length thereof.

Tin has a silvery white color and metallic luster, and is excellent in ductility and malleability. Tin, when vigorously heated in the atmosphere, is oxidized, but will not be rusted at normal temperatures. Therefore, tin will not lose luster. Thus, tin has such a nature that it is less liable to change in the air, and therefore when tin is plated on a surface of a body formed of metal such as iron, steel or copper, corrosion of the metal-formed body will not proceed, and the metal-formed body is protected by a tin-plating coating for a long time period.

A plurality of grooves $32m_X$, $32n_X$ are formed in the fixing portion 30 formed at the wiring member 38, and one end portions $31m_X$ of the first wire $6_1$ are pressed into the grooves $32m_X$, respectively, while the other end portions $31n_X$ of the first wire $6_1$ are pressed into the grooves $32n_X$, respectively. A plurality of grooves $32m_Y$, $32n_Y$ are formed in the fixing portions 30 formed at the wiring member 38, and one end portions $31m_y$ of the second wire $6_2$ are pressed into the grooves $32m_Y$, respectively, while the other end portions $31n_Y$ of the second wire $6_2$ are pressed into the grooves $32n_Y$, respectively.

The wire fixing portions 30, formed at the wiring member 38, have a plurality of holding walls $33m_X$, $33n_X$, $33m_Y$ and $33n_Y$ which form the slit portions $32m_X$, $32n_X$, $32m_Y$ and $32n_Y$ whose width is smaller than the outer diameter of the end portions $31m_X$, $31n_X$, $31m_Y$ and $31n_Y$ of the wires $6_1$ and $6_2$. With this construction, the first wires $6_1$ are positively held in the slit portions $32m_X$ and $32n_X$ formed in the fixing portions 30 formed at the wiring member 38, and the second wires $6_2$ are positively held in the slit portions $32m_Y$ and $32n_Y$ formed at the fixing portions 30.

The end portions $31m_X$, $31n_X$, $31m_Y$ and $31n_Y$ of the wires $6_1$ and $6_2$ are fixed to the wiring member 38, and also the end portions $31m_X$, $31n_X$, $31m_Y$ and $31n_Y$ of the wires $6_1$ and $6_2$ are electrically connected to press-fitting terminals 40 (FIGS. 5, 8 and 9), respectively. With this construction, even when a pulling force, vibration or the like is applied to the circuitry assembly 37 mounted in the electrical junction box 35 as shown in FIGS. 5 and 8, the end portions $31m_X$, $31n_X$, $31m_Y$ and $31n_Y$ of the wires $6_1$ and $6_2$ are positively kept fixed to the wiring member 38, and the end portion $31m_X$, $31n_X$, $31m_Y$, $31n_Y$ of the wire $6_1$, $6_2$ is positively kept electrically connected to the press-fitting terminal 40 (FIGS. 5, 8 and 9) for a long period of time.

When one end portion $31m_Y$ of one wire $6_2$ is positively fixed to the wiring member 38 by the fixing portion 30 as shown in FIG. 5, this wire $6_2$ can be fixed to the wiring member 38 by press-fitting the other end portion $31n_Y$ with the press-fitting terminal 40. When the end portions $31m_Y$ and $31n_Y$ of one wire $6_2$ are positively fixed to the wiring member 38, this wire may be interrupted at portions 49 on the insulative sheet 5.

As shown in FIGS. 2 and 5, each of part of the wires $6_1$ and $6_2$ is divided into two sections or circuits at the interrupted portion 49 disposed intermediate the opposite ends thereof. Depending on the specification of the electrical junction box, any of the wires, provided on the insulative sheet 5, may be divided into a plurality of (two or more) circuits intermediate the opposite ends thereof.

The corresponding wires $6_1$ and $6_2$, shown in FIGS. 5 and 8, are electrically connected together by resistance welding effected within the openings 7 formed in the insulative sheet 5, as shown in FIG. 2. Similarly, the corresponding wires 52 and 53, shown in FIG. 8, are also electrically connected together by resistance welding effected in the openings formed in the insulative sheet 10.

The welding process will be described. The insulative sheet 5 is interposed between the lower wires $6_1$ and the upper wires $6_2$, and the lower wires $6_1$ and the upper wires $6_2$ are installed on the wiring member 38, thereby forming the circuitry assembly 37 as shown in FIG. 2. In this condition, welding such as resistance welding is effected in the openings 7 in the insulative sheet 5, thereby directly connecting the lower and upper wires $6_1$ and $6_2$ together.

The resistance welding will be described. The two wires $6_1$ and $6_2$ are held against each other under pressure, and are clamped by a pair of electrodes (not shown), so that one wire $6_1$ is welded to the other wire $6_2$. With this process, there is formed the connecting portion 8 which has a higher connecting strength, and can more effectively withstand a pulling force and a separating force as compared with soldering.

The method of connecting the wires $6_1$, $6_2$, 52 and 53 is not limited to the above resistance welding, and instead of the resistance welding, the wires can be welded together, for example, by beam welding.

FIGS. 5 to 8 show the electrical junction box 35 incorporating the circuitry assemblies 37 and 51.

As shown in these figures, the electrical junction box 35 comprises: the casing body 36 made of synthetic resin; the circuitry assembly 37 accommodated within the casing 36; the wiring member 38 on which the circuitry assembly 37 is placed; a plurality of terminals 42 each having at one end thereof a press-fitting portion 41 for connection to the wire $6_1$, $6_2$; a connector portion $44_1$ into which male tab-like electrical contact portions $43_1$ (each formed at the other end of the terminal 42) project; and fuses (not shown) connected to fork-like electrical contact portions 45 of other terminals (not shown).

As will be appreciated from FIG. 8, before the circuitry assembly 37 is mounted in the electrical junction box 35, the circuitry assembly 51 is inserted into the interior of the casing body 36 through an opening 47. Thereafter, the circuitry assembly 37 is mounted within the casing body 36.

More specifically, when the circuitry assembly 37 is mounted within the casing body 36, the press-fitting terminals 40, provided at the casing body 36, are located near to the fixing portions 30 of the wiring member 38.

The press-fitting terminals 40, provided at the casing body 36, are electrically press-connected to the first wires $6_1$ and the second wires $6_2$ held in the fixing portions 30 of the circuitry assembly 37, so that the first wires $6_1$ and second wires $6_2$ are electrically connected respectively to the press-fitting terminals 40 simultaneously when the circuitry assembly 37 is mounted in the casing body 36. Therefore, there is provided the electrical junction box 35 which is excellent in assembling efficiency.

One example of press-fitting connection will be described with reference to FIGS. 9A and 9B.

Figure 9A:
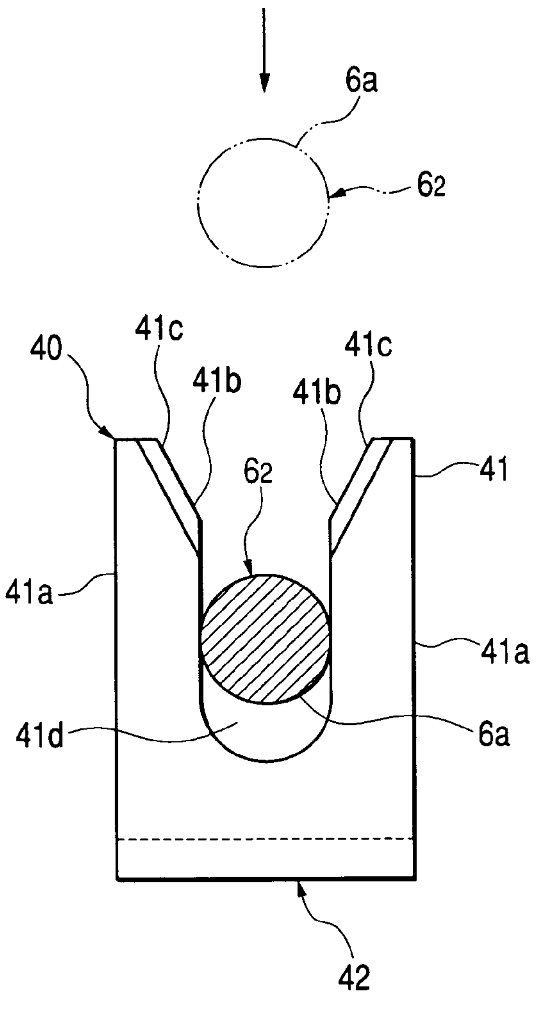
FIG. 9A is an enlarged view of an enlarged portion B of FIG. 8, showing a condition that a bare wire is press-fitted into a terminal.
Figure 9B:
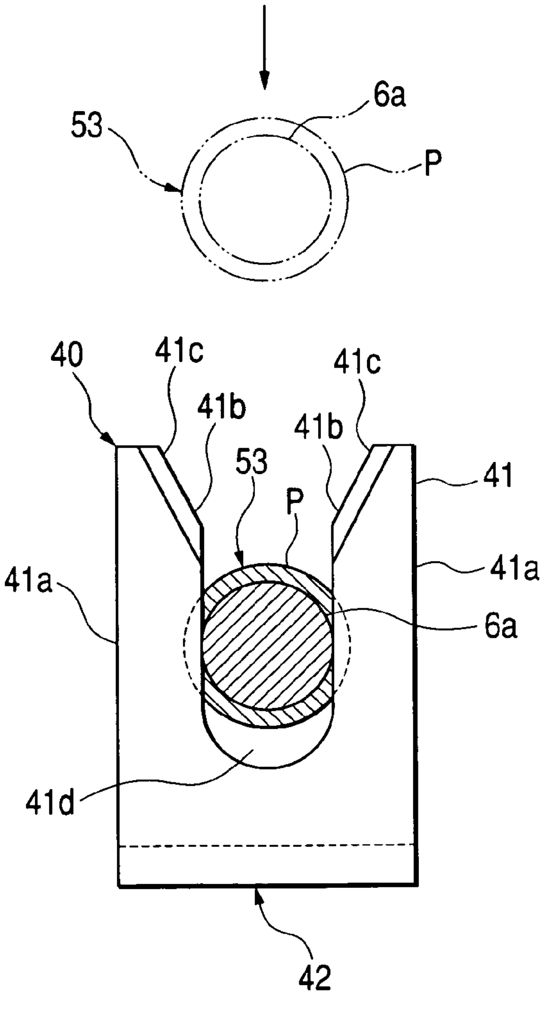
FIG. 9B is an enlarged view of an enlarged portion B of FIG. 8, showing a condition that a plated wire is press-fitted into a terminal.
Figure 10A:
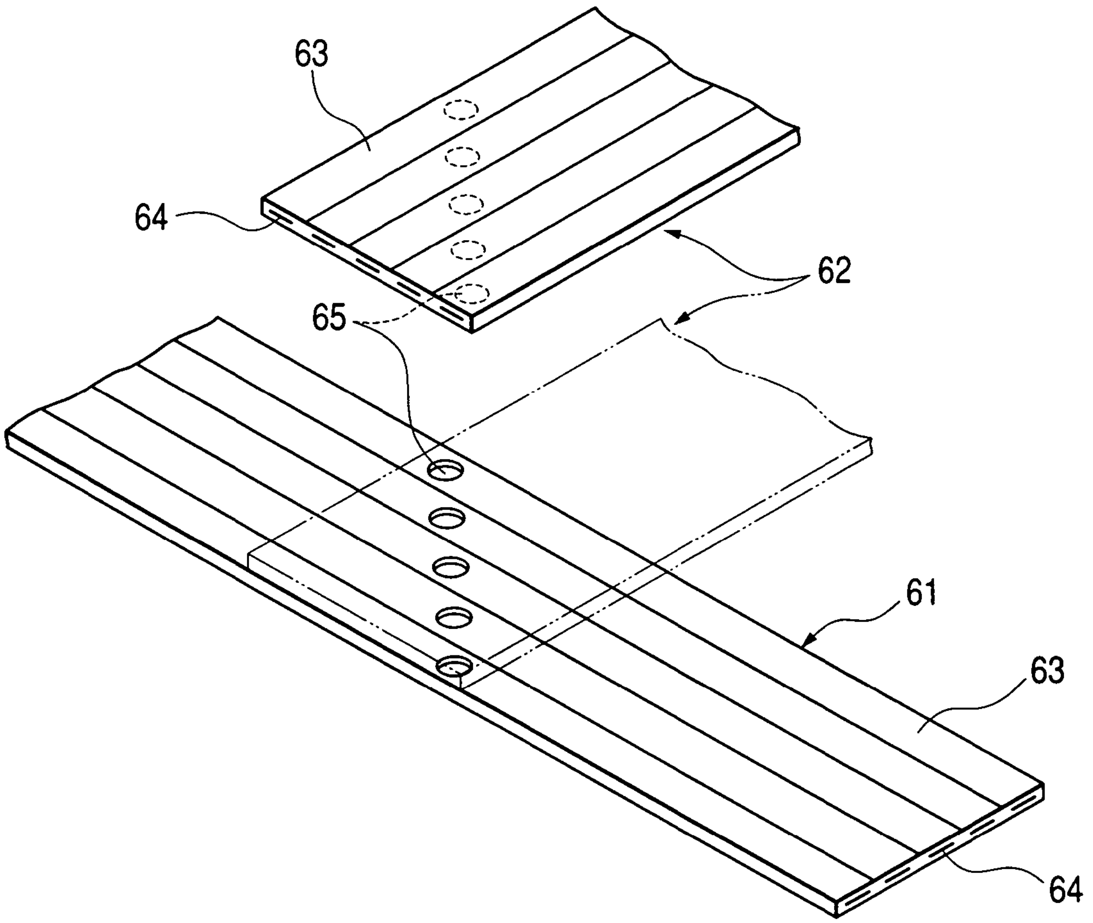
FIG. 10A is an exploded, perspective views showing a related-art branch structure of flat cables.
Figure 10B:
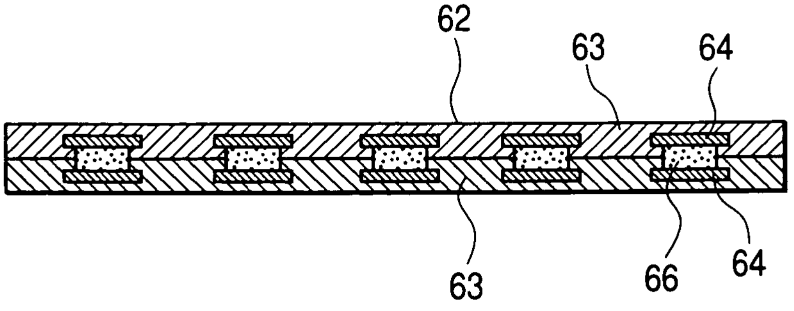
FIG. 10B is a cross-sectional view of the related-art branch structure.
Figure 11:
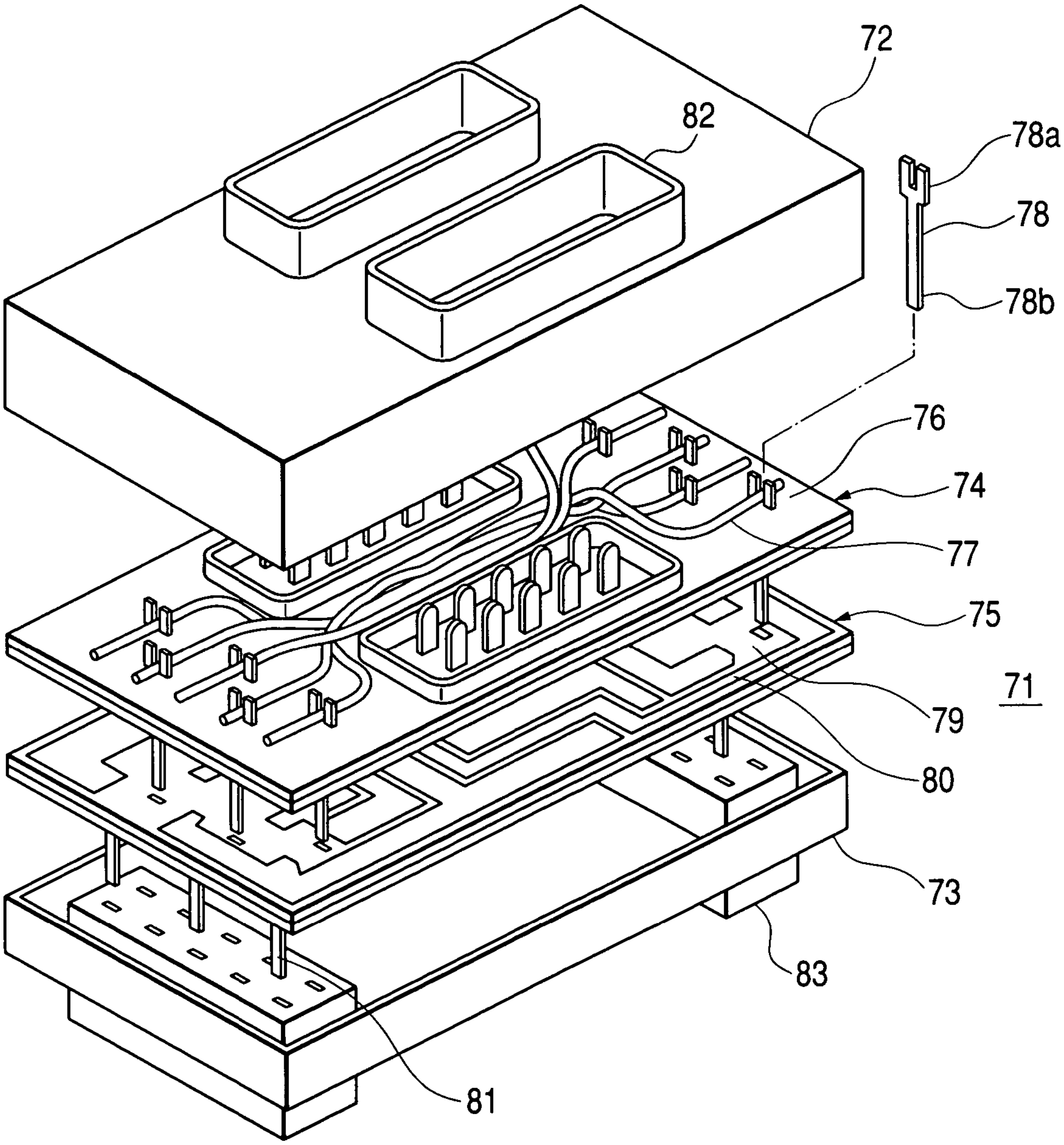
FIG. 11 is an exploded, perspective view showing a related-art electrical junction box.

As shown in FIG. 9A, the wire $6_2$ is pressed toward the press-fitting terminal 40 so as to effect the press-fitting connection, and as a result the wire $6_2$ is easily and rapidly electrically connected to the press-fitting terminal 40. When the wire $6_2$ begins to be press-contacted with a pair of press-fitting blades 41*a* of the press-fitting terminal 40, the wire $6_2$ begins to be guided into a press-fitting slit 41*d* along sharp blade portions 41*b* of slanting portions 41*c* formed respectively at the press-fitting blades 41*a*.

When the wire $6_2$ is further pressed into the press-fitting slit 41*d* between the pair of press-fitting blades 41*a*, a surface 6*a* of the wire $6_2$ is brought into contact with an edge of the press-fitting slit 41*d*, so that the wire $6_2$ is electrically connected to the press-fitting terminal 40. The press-fitting connection is thus effected, and therefore the wire $6_2$ is easily electrically connected to the press-fitting terminal 40.

As shown in FIG. 9B, the wire 53 protected by a tin-plating coating P, is pressed toward the press-fitting terminal 40 so as to effect the press-fitting connection, and as a result the wire 53 is electrically connected to the press-fitting terminal 40. When the wire 53, protected by the tin-plating coating P, begins to be press-contacted with the pair of press-fitting blades 41*a* of the press-fitting terminal 40, the tin-plating coating P, formed on the surface 6*a* of the wire 53 begins to be cut by the sharp blade portions 41*b* of the slanting portions 41*c* formed respectively at the press-fitting blades 41*a*.

When the wire 53 is further pressed into the press-fitting slit 41*d* between the pair of press-fitting blades 41*a*, the tin-plating coating P on the wire 53 is cut, and the surface 6*a* of the wire 53 is brought into contact with the edge of the press-fitting slit 41*d*, so that the wire 53 is electrically connected to the press-fitting terminal 40. Accordingly, the operation for removing the tin-plating coating P from the wire 53 and the operation for connecting the wire 53 to the press-fitting terminal 40 are carried out simultaneously.

In order to prevent the lower wires $6_1$ from being bent by the weight of the upper wires $6_2$, the lower wires $6_1$ are supported by a plurality of vertical ribs 50 formed on the wiring member 38 as shown in FIG. 8. The lower (i.e., the first layer-side) circuitry assembly 51 is located below the wiring member 38. Namely, within the electrical junction box 35, the circuitry assembly 37 is disposed above the lower circuitry assembly 51. The wiring members 38 and 54 are supported by inner walls of the casing 36.

The upper wires 53 of the circuitry assembly 51, located below the circuitry assembly 37, are disposed in contact with the lower surface of the plate body 38*a* of the wiring member 38 of the circuitry assembly 37 located at the upper side of the electrical junction box 35. The lower wires $6_1$ of the upper circuitry assembly 37 are positively insulated from the upper wires 53 of the lower circuitry assembly 51 by the wiring member 38 (made of synthetic resin) of the circuitry assembly 37.

In the circuitry assembly 51, the lower wires 52 are disposed below the upper wires 53, with the film-like insulative sheet 10 interposed therebetween. The lower wires 52 are placed directly on the plate body 54*a* of the wiring member 54 of the circuitry assembly 51. Depending on the specification of the electrical junction box, there can be used the type of electrical junction box in which instead of the wiring member 54, for example, the thick insulative sheet 15 shown in FIG. 4 is used. When the insulative sheet 15, having many wire-receiving grooves 16, is thus used in the electrical junction box, the downsizing of the electrical junction box is further enhanced.

In the electrical junction box 35 shown in FIG. 8, the directions of installation of the lower and upper wires 52 and 53 of the first layer-side circuitry assembly 51 are angled by 90 degrees relative to the directions of installation of the lower and upper wires $6_1$ and $6_2$ of the upper (i.e., second layer-side) circuitry assembly 37.

The installed condition of the lower and upper wires 52 and 53 of the first layer-side circuitry assembly 51 is reverse to the installed condition of the lower and upper wires $6_1$ and $6_2$ of the second layer-side circuitry assembly 37.

More specifically, the lower wires 52 of the first layer-side circuitry assembly 51 are parallel to the upper wires $6_2$ of the second layer-side circuitry assembly 37, and the upper wires 53 of the first layer-side circuitry assembly 51 are parallel to the lower wires $6_1$ of the second layer-side circuitry assembly 37.

The circuitry assembly 37 is received in the opening 47 in an upper wall 46 of the casing 36, and this opening 47 is covered with a cover 39 shown in FIG. 8.

As shown in FIGS. 5 and 8, generally-straight, elongated grooves 39*a*, corresponding to the wires $6_2$ (installed on the upper side of the circuitry assembly 37 disposed at the upper portion within the casing body 36) are formed in an inner surface of the cover 39, and the wires $6_2$ are received in these grooves 39*a*, respectively.

The grooves 39*a* of such a configuration are formed in the inner surface of the cover 39, and therefore when the cover 39 is attached to the upper side of the casing body 36, the wires $6_2$ are received respectively in the grooves 39*a* in the cover 39. Therefore, when the cover 39 is attached to the casing body 36, the cover 39 will not apply an undue force to the wires $6_2$, and the reliability of the wires $6_2$ is enhanced. And besides, the downsizing of the electrical junction box 35 is further enhanced.

Figure 7:
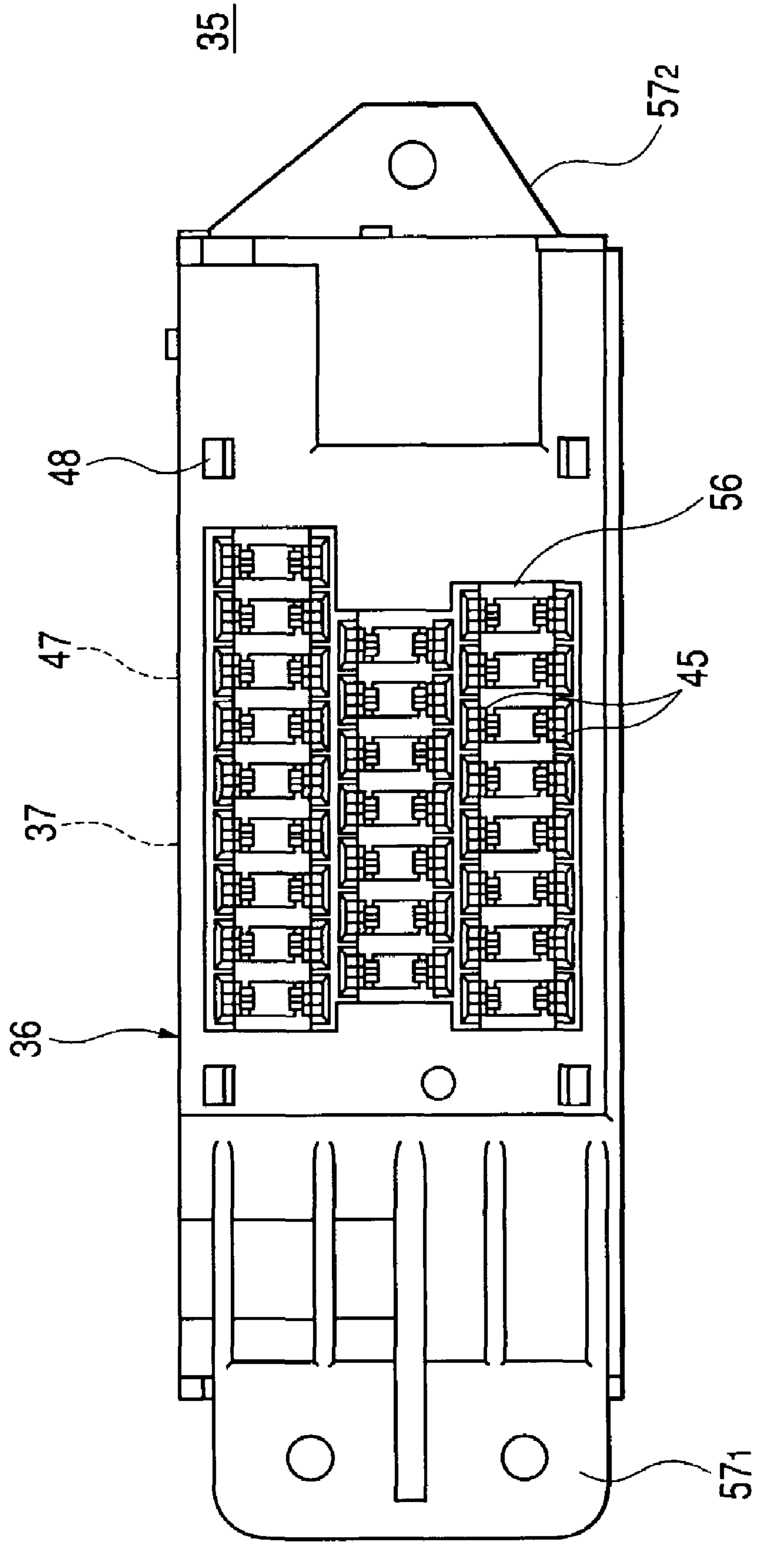
FIG. 7 is a front view of the electrical junction box.

As shown in FIG. 7, retaining projections 48 for retaining the cover 39 to the casing 36 are formed at an outer peripheral portion of the casing 36. Engagement frame portions (not shown) corresponding respectively to the retaining projections 48 are formed at the cover 39. The engagement frame portions formed at the cover 39 are retainingly engaged respectively with the retaining projections 48 formed at the casing 36, so that the cover is positively secured to the casing 36.

Figure 6:
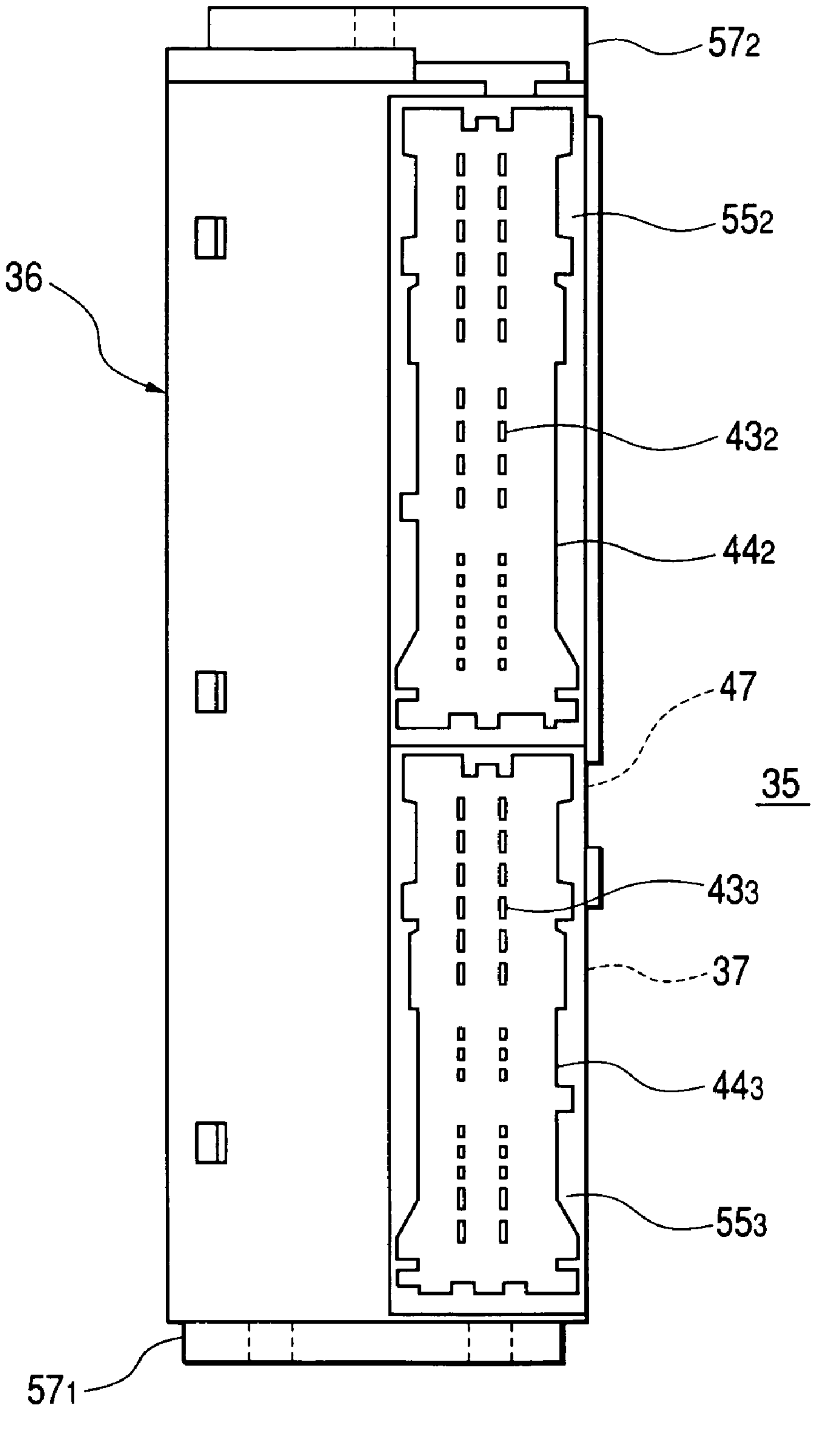
FIG. 6 is a side view of the electrical junction box.

The opposite end portions of the wires $6_1$ and 53 of the circuitry assemblies 37 and 51 are brought into press-contact with the press-fitting portions 41 of the terminals 42, provided at the right and left side portions of the casing 36, along the direction X (the direction of the width or the direction of the short sides) of the two circuitry assemblies 37 and 51, and are connected to the tab-like contact portions $43_1$ of the terminals 42 arranged in two layers, and the electrical contact portions $43_{1-3}$ project into connector housings $55_1$-$55_3$ (made of synthetic resin) which are integral with or separate from the casing 36, thereby forming connectors $44_1$-$44_3$ at the left and right side portions as shown in FIGS. 6 and B.

Connectors (not shown) of external wire harnesses are fittingly connected to the connectors $44_1$-$44_5$ (see FIG. 5). For example, as shown in FIGS. 6 and 8, the connector $44_2$ of the electrical junction box 35 serves as a connector to which an air bag system (not shown), provided with an air bag module (not shown) and so on, is connected.

The air bag system is a device in which an air bag is instantaneously inflated between the driver and a steering wheel or between a passenger on the assistant driver seat and an instrument panel upon collision of a car, thereby suppressing the injury of the driver or the passenger on the assistant driver seat to a minimum.

The opposite end portions of the wires $6_2$ and 52 arranged in two layers and extending in the direction of the length (or direction of the longer sides) of the two circuitry assemblies 37 and 51, that is, in the direction Y (see FIG. 5), are connected to the press-fitting portions 41 of the press-fitting terminals 40 provided at the front and rear sides of the casing 36.

The terminals are connected to the plurality of layers of fork-like contact portions 45, and the fork-like contact portions 45 project into fuse-mounting portions (or housings) 56 (made of synthetic resin) which are integral with or separate from the casing 36, and are connected to tab terminals (not shown) of blade-type fuses.

Instead of using the press-fitting portion 41 of the press-fitting terminal 41, the connecting portion of the terminal can be connected to the wire $\mathbf{6}_1$, $\mathbf{6}_2$, 52, 53 by clamping or welding.

By using the thin-type circuitry assemblies 37 and 51 in which the first wires and the second wires, disposed in the two layers, are joined at their intersecting portions, and with this construction a space-saving design is achieved for the internal space within the electrical junction box 35. Therefore, the downsizing of the electrical junction box is achieved, and besides the circuitry assemblies 37 and 51 can be mounted in a plurality of layers within the electrical junction box so that many fuses and multi-pole connectors can be connected to this electrical junction box. The number of layers of circuitry assemblies is not limited to two, but can be more than and less than two.

The electrical contact portions $\mathbf{43}_1$-$\mathbf{43}_3$ (FIGS. 6 and 8) of the terminals are not limited to the tab-like shape, and the electrical contact portions 45 (FIG. 7) of the terminals are not limited to the fork-like shape, and these electrical contact portions can be formed into any other suitable shape such as a female shape.

The electrical junction box 35 is fixed to a panel of the car or the like by a pair of brackets $\mathbf{57}_1$ and $\mathbf{57}_2$ (FIGS. 5 and 7). The brackets $\mathbf{57}_1$ and $\mathbf{57}_2$ are slidable relative to the casing 36 of the electrical junction box through rails 58 formed on outer walls of the casing 36, and the brackets $\mathbf{57}_1$ and $\mathbf{57}_2$ are detachably mounted on the casing 36 of the electrical junction box 35.

With this construction, only the brackets $\mathbf{57}_1$ and $\mathbf{57}_2$ can be changed in accordance with the kind of car, and the various parts, received within the electrical junction box 35, can be used as common parts. Thus, the cost for the electrical junction box can be reduced.

There is provided the electrical junction box of a common specification for use in different kinds of cars, and therefore when standardized electrical junction boxes are to be supplied to car assembling maker or others, for example, the selection of the wires to be connected together in each of the circuitry assembly 37, 51, the number of the wires to be used, the number of the circuitry assemblies to be used, etc., are suitably changed in accordance with the specification of circuits of the loads such as wire harnesses and fuses. Thus, the connection circuits of the circuitry assemblies 37 and 51, provided in the electrical junction box 35, can be easily changed in accordance with the desired specification.

Although the fuses and the connectors are connected to the electrical junction box 35 via the circuitry assemblies 37 and 51, other electrical parts, such as relays, an electronic unit including electronic parts, and so on can be connected to the electrical junction box.

What is claimed is:

1. A circuitry assembly, comprising:

a plurality of first electric wires, forming a first wire group;

a plurality of second electric wires, intersecting the first electric wires, while forming a second wire group;

a first insulative sheet, disposed between the first wire group and the second wire group; and a wiring member, which holds both of the first electric wires and the second electric wires, wherein said wiring member holds the first wire group in a first direction and the second wire group in a second direction which intersects the first direction such that the first wire group intersects the second wire group;

wherein the wiring member comprises a plurality of grooves each partly holding one of the first electric wires or one of the second electric wires; and wherein the wiring member is a rectangular plate body wherein the plurality of grooves are provided at a plurality of side edge portions of the rectangular plate body such that a first set of the plurality of grooves receives the first wire group in the first direction and a second set of the plurality of grooves receives the second wire group in the second direction.

2. The circuitry assembly as set forth in claim 1, wherein the first insulative sheet is formed with at least one opening located corresponding to at least one intersecting point at which one of the first electric wires and one of the second electric wires are electrically connected.

3. The circuitry assembly as set forth in claim 1, further comprising a second insulative sheet, disposed between the wiring member and the second wire group.

4. The circuitry assembly as set forth in claim 1, wherein the first insulative sheet is provided as a flexible film.

5. The circuitry assembly as set forth in claim 1, wherein the first insulative sheet is comprised of either polyethylene terephthalate or polyethylene naphthalate.

6. The circuitry assembly as set forth in claim 1, wherein at least one of the first electric wires and the second electric wires is plated with tin.

7. An electric junction box, comprising:

a casing body, in which the circuitry assembly as set forth in claim 1 is accommodated;

a first terminal, to which each one of the first electric wires held by the wiring member is press-fitted to be electrically connected therewith; and a second terminal, to which each one of the second electric wires held by the wiring member is press-fitted to be electrically connected therewith.

8. The electrical junction box as set forth in claim 7, further comprising a cover, formed with a plurality of grooves which respectively receive the first electric wires.

9. The circuit assembly as set forth in claim 1, wherein the first direction is perpendicular to the second direction.

10. The circuitry assembly as set forth in claim 1, wherein the wiring member holds the first electric wires and the second electric wires at a peripheral end portion of the wiring member at which the first wire group does not intersect the second wire group.

11. The circuitry assembly as set forth in claim 1, wherein the plurality of grooves of the rectangular plate body are provided at each of the side edge portions of the rectangular plate body such that the first wire group is retained in the first set of the plurality of grooves at a first pair of the side edge portions and the second wire group is retained in the second set of the plurality of grooves at a second pair of the side edge portions, which are disposed in a perpendicular relation with respect to the first pair of the side edge portions.

12. The circuitry assembly as set forth in claim 1, wherein the first insulative sheet is formed with a plurality of openings, such that each opening of the first insulative sheet provides electrical connection between a different pair of wires of the first wire group and the second wire group.

13. A circuitry assembly, comprising:

a plurality of first electric wires, forming a first wire group;

a plurality of second electric wires, intersecting the first electric wires, while forming a second wire group;
a first insulative sheet, disposed between the first wire group and the second wire group; and
a wiring member, which holds both of the first electric wires and the second electric wires,
a second insulative sheet, disposed between the wiring member and the second wire group,
wherein the second insulative sheet is formed with a plurality of grooves which respectively receive the second electric wires.

14. An electric junction box, comprising:
a casing body, in which the circuitry assembly as set forth in claim 13 is accommodated;
a first terminal, to which each one of the first electric wires held by the wiring member is press-fitted to be electrically connected therewith; and
a second terminal, to which each one of the second electric wires held by the wiring member is press-fitted to be electrically connected therewith.

15. The electrical junction box as set forth in claim 14, further comprising a cover, formed with a plurality of grooves which respectively receive the first electric wires.

16. The circuitry assembly as set forth in claim 13, wherein the wiring member comprises a plurality of grooves each partly holding one of the first electric wires or one of the second electric wires.

17. A circuitry assembly, comprising:
a plurality of first electric wires, forming a first wire group;
a plurality of second electric wires, intersecting the first electric wires, while forming a second wire group;
a first insulative sheet, disposed between the first wire group and the second wire group; and
a wiring member, which holds both of the first electric wires and the second electric wires, wherein said wiring member holds the first wire group in a first direction and the second wire group in a second direction which intersects the first direction such that the first wire group intersects the second wire group;
wherein the wiring member comprises a plurality of grooves each partly holding one of the first electric wires or one of the second electric wires;
wherein the wiring member is a rectangular plate body which includes wire fixing portions at each of four side edge portions of the rectangular plate body, said wire fixing portions each including the plurality of grooves, and
wherein a first pair of the wire fixing portions disposed at edges of the rectangular plate body parallel to the second direction retain the first wire group and a second pair of the wire fixing portions disposed at edges of the rectangular plate body parallel to the first direction retain the second wire group.

18. The circuit assembly as set forth in claim 17, wherein each of the plurality of first electric wires are separately retained by the plurality of grooves included in the first pair of the wire fixing portions and each of the plurality of second electric wires are separately retained by the plurality of grooves included in the second pair of the wire fixing portions.

19. The circuit assembly as set forth in claim 18, wherein the plurality of first electric wires intersects the plurality of second electric wires between the first pair of wire fixing portions of the rectangular body and the plurality of second electric wires intersects the plurality of first electric wires between the second pair of wire fixing portions of the rectangular body.

* * * * *